(12) United States Patent
Jiang et al.

(10) Patent No.: US 8,914,800 B2
(45) Date of Patent: *Dec. 16, 2014

(54) BEHAVIORAL MODEL BASED MULTI-THREADED ARCHITECTURE

(75) Inventors: Hong Jiang, San Jose, CA (US); Thomas A. Piazza, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 519 days.

This patent is subject to a terminal disclaimer.

(21) Appl. No.: 12/611,919

(22) Filed: Nov. 3, 2009

(65) Prior Publication Data

US 2010/0115518 A1   May 6, 2010

Related U.S. Application Data

(63) Continuation of application No. 10/750,090, filed on Dec. 31, 2003, now Pat. No. 7,614,054.

(51) Int. Cl.
| | |
|---|---|
| *G06F 9/46* | (2006.01) |
| *G06F 9/30* | (2006.01) |
| *G06F 9/48* | (2006.01) |
| *G06F 9/52* | (2006.01) |

(52) U.S. Cl.
CPC ............... *G06F 9/52* (2013.01); *G06F 9/3004* (2013.01); *G06F 9/4843* (2013.01); *G06F 9/30087* (2013.01)
USPC ........................................................ 718/102

(58) Field of Classification Search
None
See application file for complete search history.

(56) References Cited

U.S. PATENT DOCUMENTS 5,394,551 A * 2/1995 Holt et al. ..................... 710/200
5,852,731 A   12/1998 Wang et al.

(Continued)

FOREIGN PATENT DOCUMENTS

| CN | 1195144 | 10/1998 |
|---|---|---|
| CN | 1432916 | 7/2003 |

(Continued)

OTHER PUBLICATIONS

International Search Report, International Application No. PCT/US2004/043395, Search Completed: Mar. 7, 2005, Search Report Mailed: Mar. 15, 2005, 3 pages.

(Continued)

*Primary Examiner* — Mengyao Zhe
(74) *Attorney, Agent, or Firm* — Mnemoglyphics, LLC; Lawrence M. Mennemeier

(57) ABSTRACT

Multiple parallel passive threads of instructions coordinate access to shared resources using "active" and "proactive" semaphores. The active semaphores send messages to execution and/or control circuitry to cause the state of a thread to change. A thread can be placed in an inactive state by a thread scheduler in response to an unresolved dependency, which can be indicated by a semaphore. A thread state variable corresponding to the dependency is used to indicate that the thread is in inactive mode. When the dependency is resolved a message is passed to control circuitry causing the dependency variable to be cleared. In response to the cleared dependency variable the thread is placed in an active state. Execution can proceed on the threads in the active state. A proactive semaphore operates in a similar manner except that the semaphore is configured by the thread dispatcher before or after the thread is dispatched to the execution circuitry for execution.

20 Claims, 3 Drawing Sheets

(56) References Cited

U.S. PATENT DOCUMENTS

| | | |
|---|---|---|
| 6,018,785 A | 1/2000 | Wenniger |
| 7,614,054 B2 | 11/2009 | Jiang et al. |
| 2003/0167268 A1 | 9/2003 | Kumar et al. |
| 2005/0149928 A1 | 7/2005 | Jiang et al. |

FOREIGN PATENT DOCUMENTS

| | | |
|---|---|---|
| CN | 101189579 | 7/2005 |
| EP | 1700203 | 9/2006 |
| JP | 2001084235 A2 | 3/2001 |
| JP | 2007517328 | 6/2007 |
| WO | 2005/066768 | 12/2004 |

OTHER PUBLICATIONS

Office Action for Japanese Patent Application No. 2006-547392, mailed Jun. 2, 2009, 5 pages of Office Action and 7 pages of English translation.

Office Action for Chinese Patent Application No. 200480039052.4, mailed Jun. 5, 2009, 5 pages of Office Action and 6 pages of English translation.

\* cited by examiner

BEHAVIORAL MODEL BASED MULTI-THREADED ARCHITECTURE

RELATED APPLICATION

The present application is a continuation of and claims priority to U.S. patent application Ser. No. 11/750,090, entitled "BEHAVIORAL MODEL BASED MULTI-THREADED ARCHITECTURE", filed Dec. 31, 2003, now U.S. Pat. No. 7,614,054, issued Nov. 3, 2009, which is incorporated herein by reference in its entirety and for all purposes.

TECHNICAL FIELD

The invention relates to techniques and architectures for multi-threaded processing. More particularly, the invention relates to techniques and architectures using semaphores for multi-threaded processing.

BACKGROUND

A "semaphore" (also referred to as "critical sections" or "mutex") is a hardware and software construct that allows coordination or synchronization of operations in which multiple processes compete for shared resources (e.g., memory, files). In general, a semaphore is a value that is stored in a designated location in operating system memory that processes can check and change. Based on the value of the semaphore, a process can either access the shared resource or wait for a period of time and check the semaphore again.

Semaphores in conventional computer systems are typically implemented as software routines using hardware support of atomic "test and set" or similar types of instructions (e.g., lock, bit test, bit test and set, bit test and reset). Using this semaphore implementation, a producer-consumer communication relationship can be established through shared (e.g., global) data and one or more semaphores. The semaphore allows shared data to be modified by a selected one of multiple processes that are attempting to modify the data, which provides data consistency.

This semaphore construct is "passive" because threads must perform polling operations to acquire a semaphore. The polling requirement consumes processor and system resources that could otherwise be used for other purposes. Therefore, traditional semaphores can result in inefficiencies.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Overview of an Example Use of Active Semaphores

Described herein is an architecture and associated methods in which multiple parallel passive threads of instructions (hereinafter referred to as "threads") coordinate access to shared resources using "active" semaphores. The semaphores are referred to as active because the semaphore entity sends messages to execution and/or control circuitry to cause the state of a thread to change. For example, a thread can be placed in a sleep (or inactive) mode by a thread scheduler in response to an unresolved dependency, which can be indicated by a semaphore. A thread state variable corresponding to the dependency is used to indicate that the thread is in sleep mode.

When the dependency is resolved a message is passed to control circuitry (e.g., the thread scheduler) causing the dependency variable to be cleared. In response to the cleared dependency variable the thread is placed in an active (or wake) state. Execution can proceed on the threads in the active state.

Continuing with the example above, if a thread attempts to acquire a semaphore and cannot, that thread is placed in an inactive state. Because the thread is inactive, it cannot poll the semaphore to determine when the dependency indicated by the semaphore is resolved, as is required in the prior art. The thread remains in the inactive state until a message is received (e.g., from the semaphore entity) indicating that the dependency has been resolved. In response to the message, the thread is placed in the active state, which allows execution to proceed.

Figure 1:
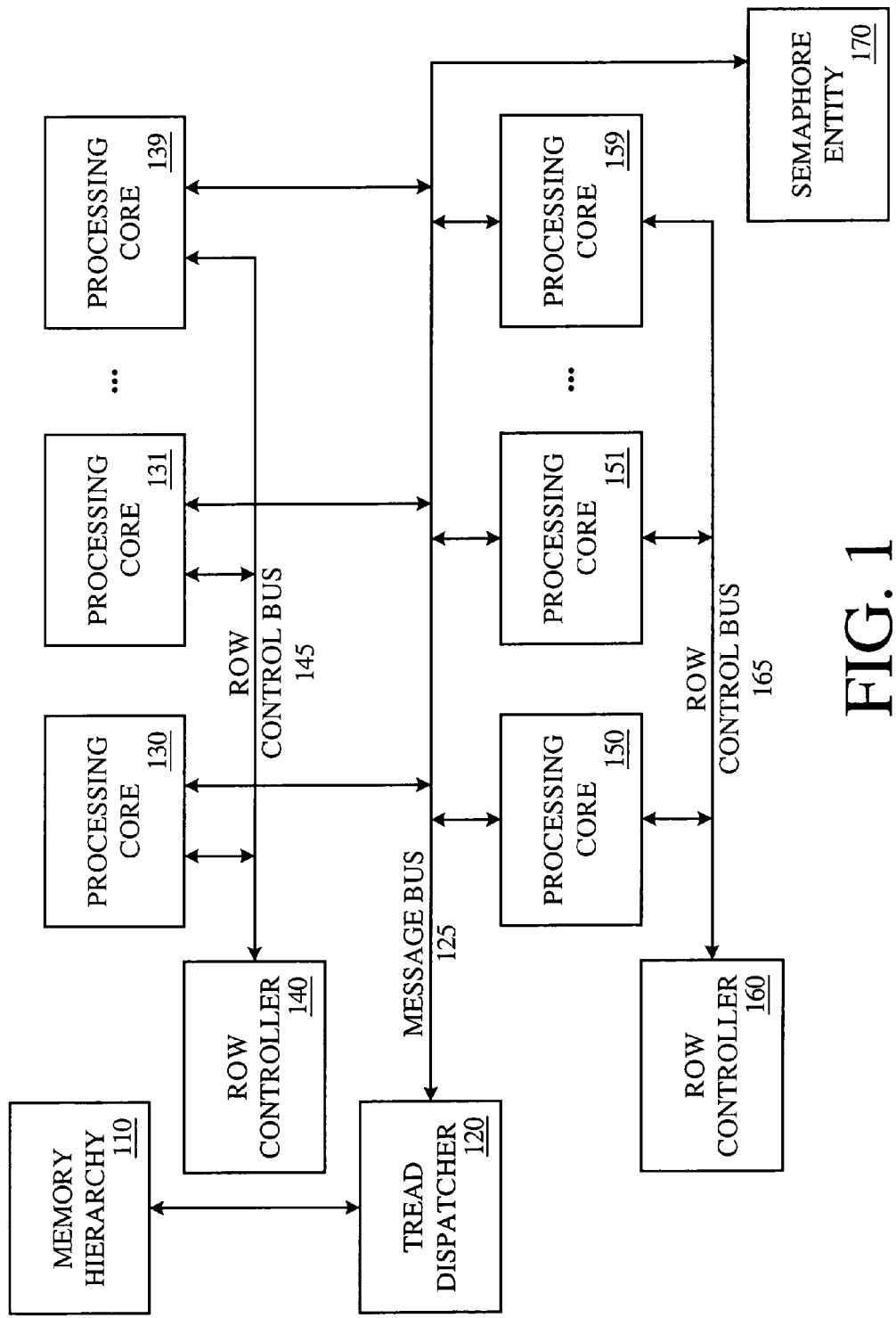
FIG. 1 is a block diagram of one embodiment of a massively multi-threaded processor architecture.

FIG. 1 is a block diagram of one embodiment of a massively multi-threaded processor architecture. As used herein, the label "massively multi-threaded" architecture refers to an architecture that includes multiple processors that can support multi-threaded execution. In one embodiment, each processor may support one or multiple threads. Multi-threading on a single processor achieves high execution efficiency by allowing active threads to be executed while other threads are in inactive state. A thread in the inactive state pending on a semaphore does not consume/waste processor resources. Notwithstanding the description with respect to a massively multi-threaded architecture, the semaphore constructs and associated methods are applicable to any multi-threaded architecture regardless of the number of threads supported.

Massively multi-threaded system 100 includes memory hierarchy 110 that stores data and instruction to be used during execution by one or more processing cores. Memory hierarchy 110 may include dynamic random access memory (DRAM), one or many levels of instruction caches, one or many levels of data caches, and/or one or many levels of shared instruction and data caches in any manner known in the art. Thread dispatcher 120 is coupled with memory hierarchy 110, receives information such as instruction pointer and data and/or data pointer associated with a new thread. Thread dispatcher 120 also coupled with the processing cores via message bus 125. In one embodiment, thread dispatcher 120 is responsible of managing the thread resources of the processing cores. Upon receiving a new pending thread, thread dispatcher 120 selects one processing core that has the resource to execute the pending thread and dispatches the thread onto the selected processing core. Upon the completion of an existing thread on a processing core, thread dispatcher 120 is informed, consequently, making the thread resource on the processing core available for future pending threads.

System 100 is illustrated with multiple processor cores (130, 131, 139, 150, 151 and 159), each of which include execution circuits with associated control circuitry. The processor cores can be identical or the processor cores can have varying functionality. Any number of processor cores can be included in system 100. In one embodiment, the processor cores are configured in rows, each row having a row controller. For example, row controller 140 can be coupled with processor cores 130, 131 and 139 via row control bus 145. Similarly, row controller 160 can be coupled with processor cores 150, 151 and 159 via row control bus 165.

The processor cores are also coupled with semaphore entity 170 via message bus 125. Semaphore entity 170 includes memory and control logic to provide semaphore functionality as described herein. In one embodiment, semaphore entity 170 interacts with the processor cores by transmitting and receiving messages as described in greater detail below.

Thread dispatcher 120 is also coupled with semaphore entity 170 via message bus 125. In one embodiment, thread dispatcher interacts with semaphore entity 170 on behalf of a thread by transmitting and receiving messages as described in greater detail below.

Control circuitry in each processing core may contain thread scheduling circuitry to manage the state of multiple threads executing on the same processing core and may also contain instruction scheduling circuitry to execute an active thread of instructions. During instruction execution, one or more of the processing cores will attempt to access shared system resources. In order to gain control of a shared system resource a thread, through the corresponding execution core, must gain control of a semaphore corresponding to the shared system resource to be accessed.

In one embodiment, in order to gain control of a semaphore, the requesting processing core sends a semaphore request message to semaphore entity 170 over message bus 125. After sending the semaphore request message, the requesting thread is placed in an inactive state in which execution and associated operations (e.g., polling of semaphores) halts.

In response to receiving the semaphore request message, semaphore entity 170 determines whether to grant control of the semaphore to the requesting thread. When the semaphore is granted, semaphore entity 170 sends a semaphore acknowledge message to the requesting thread. In response to the semaphore acknowledge message, the requesting thread is restored to an active state in which execution using the requested resource continues. When the thread has completed use of the shared resource, the thread sends a release semaphore message to semaphore entity 170. In response to the release semaphore message, semaphore entity 170 releases the semaphore and allows other threads to gain access to the system resource.

In one embodiment, semaphores are supported by instructions (semaphore instructions) that are executed by a processing core as well as messages (semaphore messages) that are passed between processing cores and semaphore entity over, for example, a message bus 125. In alternate embodiments, different and/or additional messages or instructions can be supported.

Semaphore Entity Based on a Linked List

In one embodiment, traditional per semaphore queues are replaced by a buffer pool having entries that are used to form a linked list for each semaphore. Thus, each semaphore can be a head pointer to a linked list formed from entries in the buffer pool. The linked list can be either a bi-directional linked list or a uni-directional linked list.

In one embodiment, a semaphore table includes a pointer for each semaphore supported. In one embodiment, the pointers in the semaphore table are head pointers that indicate a head of a linked list to be used for the corresponding semaphore. A free pool pointer indicates the head of buffer pool and unused semaphore entries include a NULL pointer.

In one embodiment, each semaphore entry includes a released-state field, an ack-suppression field, a thread identifier field, a previous pointer and a next pointer. In alternate embodiments, other and/or different fields can be used, for example, the previous pointer can be omitted. In one embodiment, each semaphore can also include a single bit (or other indicator) to indicate whether the linked list corresponding to the semaphore is empty.

Semaphore Messages

An Acquire Semaphore Message (ACQ_MSG) is used for a thread, or a thread dispatcher on behalf of a thread, to make a request to the semaphore entity for ownership of a semaphore. In one embodiment, the ACQ_MSG contains a semaphore identifier field, a thread identifier field, an "auto-release" field and an "acknowledge-suppression" (ack-suppression) field. The auto-release field is used for a thread with only a head dependency. That is, the thread depends on previous threads, but no subsequent threads depend on the thread. The ack-suppression field is used for a thread with only a tail dependency. That is, the thread does not depend on any previous threads, but the thread does have subsequent threads depending on it. The ACQ_MSG can be issued by a thread dispatcher or other control circuitry associated with the thread.

In one embodiment, upon receiving the ACQ_MSG the semaphore entity enqueues the semaphore entry for the request thread to a linked list of the target semaphore (specified by the semaphore identifier field) by removing the head entry from a free pool list and adding it to the tail of the selected semaphore. The fields of the semaphore entry are updated based on the information in the ACQ_MSG: the thread identifier field, the release-state field and the ack-suppression field are replaced by the requester's thread identifier, the auto-release field and the ack-suppression field in the ACQ_MSG. If the semaphore linked list is not empty before the ACQ_MSG no message is sent by the semaphore entity. Otherwise, if the semaphore linked list is empty before the ACQ_MSG is received one of the following actions is taken.

If the ack-suppression field is not set an ACK_MSG with the thread identifier is sent from the semaphore entity on the message bus 125 to the requesting thread. If the ack-suppression field is set no ACK_MSG is sent from the semaphore entity. If the auto-release field is not set, the just-enqueued semaphore entry is maintained in the semaphore linked list. Consequently, the semaphore linked list is not empty and the semaphore is currently owned by the thread. If the auto-release field is set the just-enqueued semaphore entry is removed from the semaphore linked list, and consequently, the semaphore linked list is empty.

A Release Semaphore Message (REL_MSG) is used for a thread to make a request to the semaphore entity to free ownership of a semaphore. In one embodiment, the REL_MSG includes a semaphore identifier field and a thread identifier field. In one embodiment, the REL_MSG can only be issued by control circuitry associated with a thread holding ownership of the semaphore, i.e., the thread identifier is at the top of the semaphore linked list. Upon receiving the REL_MSG the semaphore entity removes the entry from the head of the semaphore linked list.

In another embodiment, the REL_MSG can be issued by control circuitry associated with any thread sharing the semaphore. Upon receiving the REL_MSG the semaphore entity unsets the release-state field to the corresponding entry in the semaphore linked list regardless of the position of the entry in the linked list. If semaphore entry is at the head of the linked list, the entry is removed from the head of the semaphore linked list. The next entry is then becoming the head of the linked list. If the next entry is not NULL, it will be examined. If the new head of the linked list has the release-state field set, it is again removed from the head of the semaphore linked list.

In one embodiment, this recursive process continues until either the head of the linked list is NULL (the semaphore queue is empty) or the head of the linked list has the released-state field unset (waiting for the release of the semaphore from the thread corresponding to the entry). If the head of the linked list is not NULL and the ack-suppression field is not set, an ACK_MSG is sent by the semaphore entity to the thread identified by the entry's thread identifier field. If the head of the linked list is not NULL and the ack-suppression field is set, no ACK_MSG is sent.

The Semaphore Acknowledgement Message (ACK_MSG) is generated by the semaphore entity to notify a thread that the requested semaphore has been acquired. In one embodiment, the ACK_MSG includes a semaphore identifier field and a thread identifier field. The ACK_MSG is issued only by the semaphore entity and received by the processing core executing the thread identified by in the thread identifier field.

Upon receiving the ACK_MSG the receiving processing core unsets the wait-semaphore state field of the thread identified by the thread identifier field. If the thread is in an inactive state, the thread state is changed to an active state.

Semaphore Instructions

An Acquire Semaphore (ACS) instruction causes an ACQ_MSG message to be sent to the semaphore entity with a semaphore identifier of the requested semaphore, the thread identifier of the requesting thread and with the auto-release field unset. The thread is put in an inactive state with the wait-semaphore state field set. The ACS instruction is paired with (followed by) a Release Semaphore (RLS) instruction (described below). The ACS-RLS instruction pair can be used, for example, for critical section applications.

An Acquire Semaphore with Auto-Release (ASR) instruction causes an ACQ_MSG to be sent to the semaphore entity with a semaphore identifier for the requested semaphore, a thread identifier of the requesting thread and with the auto-release field set. The thread is put in an inactive state with the wait-semaphore state field set. In one embodiment, the ASR instruction cannot be paired with the RLS instruction. In one embodiment, the ASR instruction is used for threads with only a head dependency.

A Wait Semaphore (WTS) instruction causes the wait-semaphore thread state field to be checked. If the state field is set the thread is put in the inactive state. If the state field is not set the thread remains in the active state. No message is sent to the semaphore entity in response to a WTS instruction. Use of the WTS instruction implies that the semaphore was acquired previously by the thread dispatcher using the ACQ_MSG on behalf of the thread at the thread dispatch time. The WTS instruction is not used if the ack-suppression field is set in the ACQ_MSG previously issued by the thread dispatcher.

A Release Semaphore (RLS) instruction causes a REL_MSG to be sent to the semaphore entity with a semaphore identifier for the semaphore being released and a thread identifier for the releasing thread. The releasing thread remains in the active state. If an ACS instruction has been previously issued for the releasing thread only one RLS instruction is issued. If an ASR instruction has been previously issued for the releasing thread no RLS instruction is issued. If a WTS instruction has been issued for the releasing thread, the WTS instruction may or may not be followed by a RLS instruction depending on the auto-release field of the ACQ_MSG sent by the thread dispatcher. If the auto-release field is unset, no RLS instruction should be issued. If the auto-release field is set a RLS instruction should follow the WTS instruction.

Example Acquisition of an Active Semaphore

As a thread of instructions is executed by a processing core, the instructions are executed when resources are available. When a resource having a semaphore is required, for example, a shared memory location, ownership of a semaphore may be required to access the resource. Thus, execution of the thread of instructions is accomplished in any manner known in the art until a semaphore is needed.

In one embodiment, when a semaphore is needed, an Acquire Semaphore (ACS) instruction is executed. The ACS instruction can be executed by the processing core executing the thread of instructions requesting the semaphore. As part of, or in response to, execution of the ACS instruction, an Acquire Semaphore Message (ACQ_MSG) is transmitted to the semaphore entity by the processing core executing the thread over the message bus. One format for the ACQ_MSG is described above. Other formats can also be used.

As part of, or in response to, execution of the ACS instruction, the thread requesting the semaphore is placed in an inactive state with the wait-semaphore state field set. By placing the thread in the inactive state, instructions in the thread are not executed, which includes polling of the requested semaphore should the initial semaphore request be refused. By placing the thread in the inactive state processor resources and system bandwidth are not consumed by the thread waiting for the semaphore. For a processing core supporting multi-threading, the processor resources and system bandwidth can be used by other active threads.

The semaphore entity receives the ACQ_MSG and places the requester information entry in the linked list of the target semaphore. If the semaphore is not owned or controlled by another thread, the semaphore entry is placed at the head of the semaphore linked list because there are no other entries. If the semaphore is owned or controlled by another thread, the semaphore entry is placed at the tail of the semaphore linked list. In one embodiment, the tail of the linked list is identified by traversing the linked list entries in the buffer pool from a head entry to a tail entry and the new entry becomes the new tail entry. In another embodiment, the tail of the linked list is directly identified by the tail pointer of the linked list stored in the semaphore table.

As threads complete use of the resource corresponding to the semaphore the thread holding the semaphore releases control of the semaphore, which is described in greater detail below. When a semaphore is released the corresponding semaphore entry at the head of the semaphore linked list is removed and the subsequent semaphore entry in the linked list becomes the head of the linked list.

When a semaphore entry becomes the head of the semaphore linked list, its state fields are examined by the semaphore entity. If the ack-suppression field is not set, an acknowledgement message (ACK_MSG) is transmitted from the semaphore entity to the thread associated with the semaphore entry. One format for the ACK_MSG is described above. Other formats can also be used. The ACK_MSG indicates to the receiving entity (e.g., a thread) that the receiving entity has been granted control of the corresponding semaphore.

In response to the ACK_MSG the corresponding thread is activated. When activated, processing of instructions in the thread resumes and the shared resource corresponding to the semaphore can be accessed. When the thread has completed access to the shared resource the semaphore is released, which is described in greater detail below.

Example Release of an Active Semaphore

In one embodiment, a semaphore is released when a Release Semaphore (RLS) instruction is executed. The RLS instruction can be executed by the processing core executing the thread of instructions requesting the semaphore. As part of, or in response to, execution of the RLS instruction, a Release Semaphore Message (REL_MSG) is transmitted to the semaphore entity. One format for the REL_MSG is described above. Other formats can also be used.

In response to the REL_MSG, the semaphore entity matches the thread identifier field of the REL_MSG with the semaphore linked list. The semaphore entity checks whether the corresponding semaphore entry is at the head of the linked list. If the corresponding semaphore entry is at the head of the linked list, the semaphore entity removes the thread entry from head of the linked list. The subsequent entry in the linked list becomes the head entry. The semaphore can then be granted to the thread corresponding to the new head entry. If the corresponding semaphore entry is not at the head of the linked list, the semaphore entity set the release-state field of the semaphore entry.

Behavior Models

Based on the formation of the linked list used, semaphores can be classified as associative semaphores or ordered semaphores. Based on the transmission of the ACK_MSG from the semaphore entity, semaphores can be classified as active semaphores or as proactive semaphores. Thus, four types of semaphores can be supported.

Overview of One Embodiment of Associative Semaphores

An associative semaphore allows concurrent threads to access the semaphore in any order. In one embodiment, a semaphore is initialized by the thread dispatcher at the beginning of a session with a NULL linked list (or a single bit to indicate an empty linked list). No other message is sent from the thread dispatcher to the semaphore entity. The semaphore linked list is built on the fly by the execution circuitry executing the multiple threads of instructions.

In one embodiment, a thread makes a request for an associative semaphore by executing an ACS or an ASR instruction. The thread releases an associative semaphore by executing a RLS instruction. In one embodiment, a new ACQ_MSG will result in an entry corresponding to the requesting thread being placed at the tail of the semaphore linked list. This provides a first-come, first-served (FCFS) semaphore model.

Overview of One Embodiment of Ordered Semaphores

An ordered semaphore allows concurrent threads to access the semaphore in a predetermined order. The order is predetermined by the thread dispatcher at the time of dispatching. The order can be application dependent. As thread dispatching is sequential in nature, the thread dispatcher may send an ACQ_MSG on behalf of each dispatched thread to the semaphore entity to build the semaphore linked list according to that order.

A thread entering a critical section may use the WTS instruction to wait for ownership of the semaphore. The ACS and ASR instructions are not used as the thread will have already been placed in the semaphore linked list. In one embodiment, the semaphore entity can only provide control of the semaphore according to the linked list order. Threads waiting on the semaphore will receive the ACQ_MSG in the linked list order.

Overview of One Embodiment of Active Semaphores

As described above, with an active semaphore the ACQ_MSG is used to cause a transition of a thread from an inactive state to an active state. The semaphore entity receives one or many ACQ_MSGs from execution circuitry executing threads. The semaphore entity only transmits one ACK_MSG to the execution circuitry corresponding to the thread at the head of the semaphore linked list. Upon removing the head of the semaphore linked list, the semaphore entity examines the state of the new head of the linked list, and may transmit subsequent ACK_MSG to the execution circuitry corresponding to the thread of the new head of semaphore linked list. An active semaphore can also be an associative semaphore.

Overview of One Embodiment of Proactive Semaphores

A proactive semaphore transmits one and only one ACK_MSG to the thread at the head of the semaphore linked list whether or not the thread is in the inactive state. This applies to threads using ordered semaphores with ACQ_MSG sent previously by the thread dispatcher so that only one ACK_MSG sent to a thread. A thread using an ordered semaphore may contain a WTS and/or a RLS instruction.

For a proactive semaphore, the ACK_MSG is sent automatically by the semaphore entity to the thread at the head of the semaphore linked list. In one embodiment, there exists a possibility of a "risk condition" that may exist if the timing of an entry from a thread is enqueued in the semaphore linked list by the thread dispatcher and the time the thread is visible to the execution circuitry. Because both actions are initiated by the thread dispatcher, but occur through different data paths, the timing of these events must be considered.

If thread execution begins before semaphore configuration, there will be no risk condition if there is a WTS instruction in the thread. Because the wait-semaphore thread state variable is set by the thread dispatcher, even if the WTS instruction of the thread is reached before the thread is enqueued to the semaphore linked list the risk condition will not occur. The WTS instruction causes the thread to enter the inactive state without sending a message to the semaphore entity. When the semaphore entity sends an ACK_MSG to the thread, the execution circuitry causes the thread to be active again.

If the semaphore is configured by the thread dispatcher with the ack-suppression field set a risk condition may result. In this case, the thread will not be placed in the inactive state. Instead, if the thread reaches the RLS instruction and sends a REL_MSG to the semaphore entity before the semaphore is configured for the thread, the semaphore entity may not be in condition to process the REL_MSG. In order to avoid this risk condition, the thread execution and the semaphore entity can ensure that the REL_MSG does not pass the ACQ_MSG issued by the thread dispatcher.

Thus, in one embodiment, in order to avoid the risk condition, the thread dispatcher completes thread configuration before completion of semaphore configuration if the ack-suppression is not set. The thread dispatcher completes semaphore configuration before completion of thread configuration if the ack-suppression field is set. Because the thread dispatcher dispatches ready thread serially, sequential operations can ensure the necessary orderings.

When thread configuration is completed before semaphore configuration, the thread dispatcher can dispatch a thread and wait for a signal that indicates that thread configuration is complete before sending a message to cause configuration of the semaphore. When semaphore configuration is completed before thread configuration, the thread dispatcher can send a message to initiate configuration of the semaphore and wait for a signal that indicates that the semaphore configuration is complete before dispatching the thread. Because serial configurations can unnecessarily limit the throughput from the dispatcher, the configuration operations can be pipelined.

Figure 2:
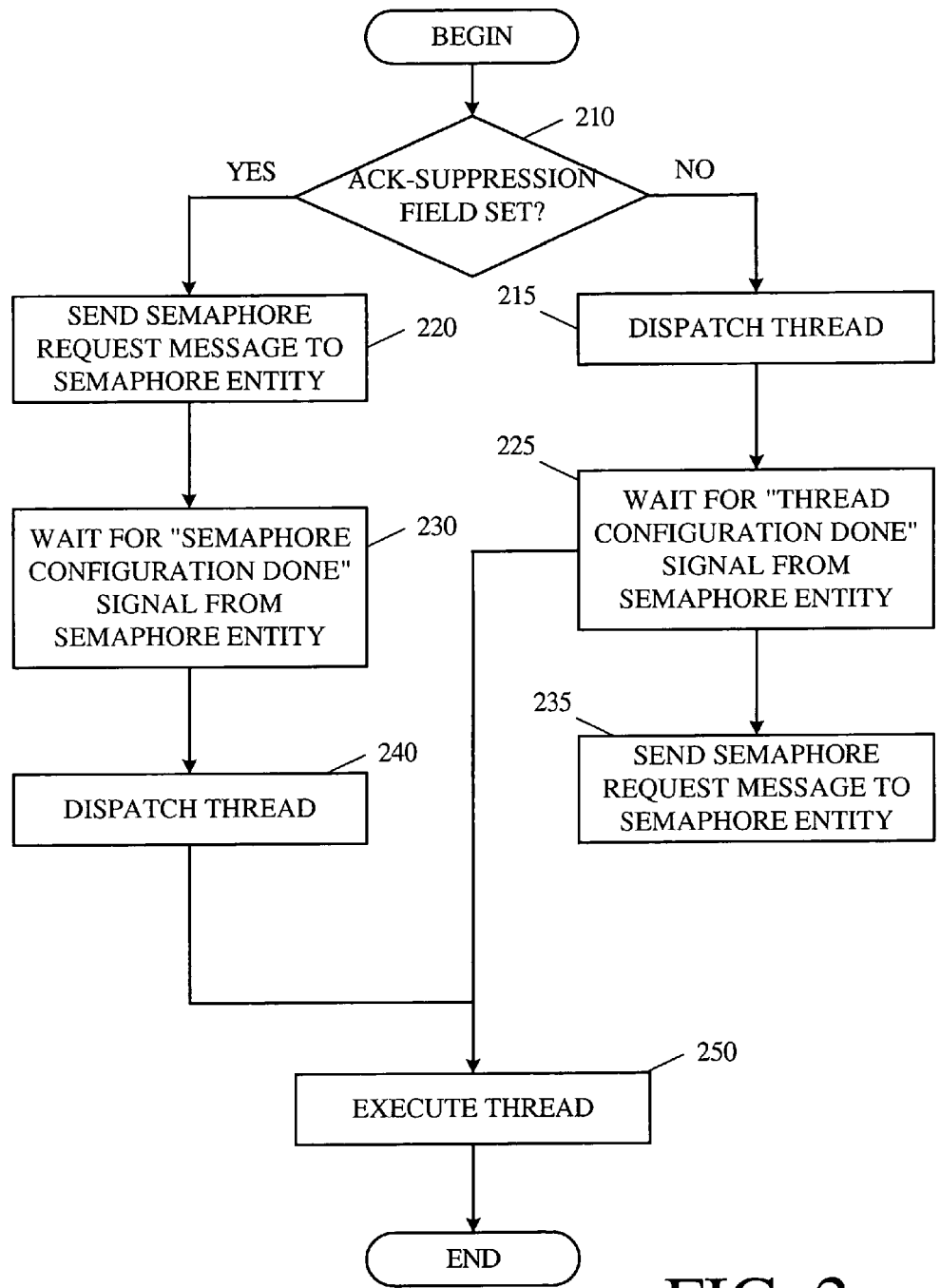
FIG. 2 is a flow diagram of one embodiment of coordination of thread dispatch and semaphore initialization operations.

FIG. 2 is a flow diagram of one embodiment of coordination of thread dispatch and semaphore initialization operations. In one embodiment, the thread dispatcher determines whether the ack-suppression field is set for the semaphore message to be transmitted, 210. In alternate embodiments, other system components can determine whether the ack-suppression field is or will be set.

If the ack-suppression field is set, 210, the thread dispatcher sends a semaphore request message (e.g., ACQ_MSG) to the semaphore entity, 220. The semaphore entity processes the request message and transmits a "semaphore configuration done" signal to the thread dispatcher when the request message has been processed (e.g., a linked list entry has been enqueued for the requesting thread). The "semaphore configuration done" signal can take any form, for example, a single line can be used to transmit a one-bit signal, or a message can be transmitted over the message bus.

The thread dispatcher waits for the "semaphore configuration done" signal from the semaphore entity, 230. While waiting for the "semaphore configuration done" signal, the thread dispatcher can, for example, dispatch other threads or perform operations that do not cause the thread to be dispatched. After receiving the "semaphore configuration done" message the thread dispatcher dispatches the thread to the execution circuitry, 240. The thread is then executed by the execution circuitry, 250.

If the ack-suppression field is not set, 210, the thread dispatcher dispatches the thread to the execution circuitry, 215. After dispatching the thread to the execution circuitry, the thread dispatcher waits for a "thread configuration done" signal from the execution circuitry, 225. In one embodiment, the execution circuitry sends the "thread configuration done" signal to the thread dispatcher when the execution circuitry is set to begin execution of the thread. The "thread configuration done" signal can take any form, for example, a single line can be used to transmit a one-bit signal, or a message can be transmitted over the message bus. The thread is then executed by the execution circuitry, 250.

While waiting for the "thread configuration done" signal, the thread dispatcher can, for example, dispatch other threads or perform operations that do not cause the semaphore request message to be transmitted. After receiving the "thread configuration done" message the thread dispatcher transmits a semaphore request message to the semaphore entity, 235. This can occur after thread execution has begun or concurrent with the beginning of thread execution.

The example of FIG. 2 provides a sequential example of coordination of thread execution and semaphore configuration with a proactive semaphore. As mentioned above, the operations described with respect to FIG. 2 can also be performed in a pipelined manner.

Thread Synchronization

Figure 3A:
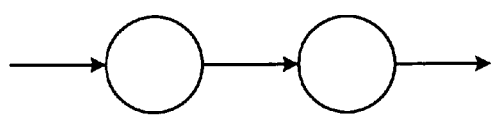
FIGS. 3a-3d are conceptual illustrations of dependencies in which semaphores can be used to synchronize thread execution.

FIGS. 3a-3d are conceptual illustrations of dependencies in which semaphores can be used to synchronize thread execution. FIG. 3a illustrates a 1:1:1 (one on one) dependency. The dependency of FIG. 3a can be a strong sequential order dependency or an associative dependency. For a strong sequential order dependency, a single proactive, ordered semaphore can be used. In one embodiment, in the ACQ_MSG sent from the thread dispatcher to the semaphore entity to request the semaphore, the ack-suppression field and the auto-release field are both unset. The thread of instructions includes a WTS-RLS instruction pair to obtain and release the semaphore.

For an associative dependency, a single active, associative semaphore can be used. In one embodiment, in the ACQ_MSG sent from execution circuitry executing a thread to the semaphore entity to request the semaphore, the ack-suppression field and the auto-release field are both unset. The thread of instructions includes an ACS-RLS instruction pair to obtain and release the semaphore.

Figure 3B:
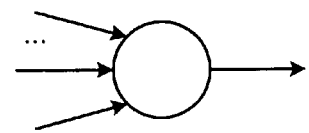

FIG. 3b illustrates a 1:N (one on many) dependency, where one thread has head dependency on N other threads where the N other threads do not depend on each other. Here N is a positive integer number that can be one or greater than one. For a 1:N dependency, a single proactive, ordered semaphore can be used. In one embodiment, for the N independent threads, ACQ_MSGs are sent by the thread dispatcher on behalf of the N threads. In the ACQ_MSG sent from the thread dispatcher to the semaphore entity to request the semaphore, the ack-suppression field is set and the auto-release field is unset. For the single thread, which has head dependency on the other N threads, an ACQ_MSG is also sent by the thread dispatcher. In the ACQ_MSG to request the semaphore, the ack-suppression field is unset and the auto-release field is set. The N threads of instructions include only an RLS instruction to release the semaphore. The single thread of instructions includes a WTS-RLS instruction pair to obtain and release the semaphore.

Figure 3C:
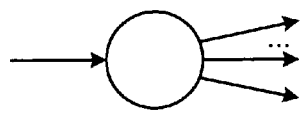

FIG. 3c illustrates a N:1 (many on one) dependency, where N threads have head dependency on a single thread but the N threads do not depend on each other. For a N:1 dependency, a single proactive, ordered semaphore can be used. In one embodiment, the thread dispatcher is responsible of sending ACQ_MSG on behave of both the N depending threads and the one dependent thread. In one embodiment, for the single dependent thread, in the ACQ_MSG to request the semaphore, the ack-suppression field is set and the auto-release field is unset. For the N depending threads, in the ACQ_MSG to request the semaphore, the ack-suppression field is unset and the auto-release field is set. The single dependent thread of instructions includes only an RLS instruction to release the semaphore. The N depending threads of instructions include a WTS-RLS instruction pair to obtain and release the semaphore.

Figure 3D:
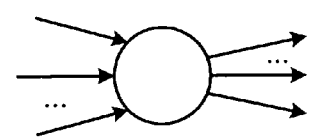

FIG. 3d illustrates a N:M (many on many) dependency, where N depending threads have head dependency on M dependent threads. In this case, the N depending threads do not depend on each other, and the M dependent thread do not depend on each other. The N:M dependency case is a more general case comparing to the 1:1:1, 1:N and N:1 cases described above. For a N:M dependency, a single proactive, ordered semaphore can be used. In one embodiment, the thread dispatcher is responsible for sending ACQ_MSGs on behalf of both the N depending threads and the M dependent threads. In one embodiment, for the M dependent threads, in the ACQ_MSG to request the semaphore, the ack-suppression field is set and the auto-release field is unset. For the N depending threads, in the ACQ_MSG to request the semaphore, the ack-suppression field is unset and the auto-release field is set. The M dependent threads of instructions include only an RLS instruction to release the semaphore. The N depending threads of instructions include a WTS-RLS instruction pair to obtain and release the semaphore.

The dependencies of FIGS. 3a-3d can be used to support more complex dependencies. For example, for a N:1:N dependency, two proactive, ordered semaphores are used. The N:1 dependency is processed as described above with respect to FIG. 3c and the 1:N dependency is processed as described above with respect to FIG. 3b.

CONCLUSION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

The invention claimed is:

1. A method comprising:
    determining a state of a variable corresponding to a semaphore, wherein the variable corresponding to the semaphore is to indicate whether or not a semaphore entity is to transmit a message indicating control of the semaphore;
    generating a semaphore entry for a thread of instructions prior to dispatch of the thread for execution responsive to the variable being in a first state; and
    dispatching the thread of instructions for execution prior to generating the semaphore entry for the thread responsive to the variable being in a second state different from the first state.

2. The method of claim 1, further comprising dispatching the thread of instructions for execution and during the thread execution generating a semaphore entry for the thread if the variable is in a third state.

3. The method of claim 1, wherein generating the semaphore entry for the thread of instructions prior to dispatch of the thread of instructions if the variable is in the first state comprises:
    transmitting a message to a semaphore entity to request control of the semaphore by the thread of instructions; and
    dispatching the thread of instructions to execution circuitry in response to receiving a signal indicating that the semaphore entity has processed the message.

4. The method of claim 3, wherein the transmitting the message to the semaphore entity and dispatching the thread of instructions are pipelined.

5. The method of claim 3, wherein the message comprises a semaphore identifier field, a thread identifier field, and a field corresponding to the variable.

6. The method of claim 1, wherein dispatching the thread of instructions for execution prior to generating the semaphore entry for the thread if the variable is in a second state comprises:
    dispatching the thread of instructions to execution circuitry; and
    transmitting a message to a semaphore entity to request control of the semaphore by the thread of instructions in response to a signal indicating that execution of the thread of instructions has commenced.

7. The method of claim 6, wherein the dispatching of the thread of instructions and transmitting of the message to the semaphore entity are pipelined.

8. The method of claim 6, wherein the message comprises a semaphore identifier field, a thread identifier field, and a field corresponding to the variable.

9. The method of claim 2, wherein dispatching the thread of instructions for execution and during the thread execution generating the semaphore entry for the thread if the variable is in a third state comprises:
    dispatching the thread of instructions to execution circuitry; and
    transmitting a message to a semaphore entity to request control of the semaphore by the thread of instructions in response to the execution of a set of instructions.

10. The method of claim 9, wherein the set of instructions comprises an acquire semaphore instruction.

11. The method of claim 9, wherein the set of instructions comprises an acquire semaphore with auto-release instruction.

12. An apparatus comprising:
    an execution circuitry to execute instructions of a thread of instructions;
    a storage device to store a variable corresponding to a semaphore;
    logic to determine a state of the variable corresponding to the semaphore, wherein said variable indicates whether or not a semaphore entity is to transmit a message indicating control of the semaphore to the execution circuitry corresponding to a thread of instructions;
    logic to generate a semaphore entry for the thread of instructions prior to dispatch of the thread for execution responsive to the variable being in a first state; and
    logic to dispatch the thread of instructions for execution prior to generating the semaphore entry for the thread responsive to the variable being in a second state different from the first state.

13. The apparatus of claim 12, further comprising logic to dispatch the thread of instructions for execution and during the thread execution generating a semaphore entry for the thread if the variable is in a third state.

14. The apparatus of claim 12, wherein the means for generating the semaphore entry for the thread of instructions prior to dispatch of the thread of instructions if the variable is in the first state further comprises:
    logic to transmit a message to a semaphore entity to request control of the semaphore by the thread of instructions; and
    logic to dispatch the thread of instructions to execution circuitry in response to receiving a signal indicating that the semaphore entity has processed the message.

15. The apparatus of claim 12, wherein the means for dispatching the thread of instructions for execution prior to generating the semaphore entry for the thread if the variable is in a second state further comprises:
    logic to dispatch the thread of instructions to execution circuitry; and
    logic to transmit a message to a semaphore entity to request control of the semaphore by the thread of instructions in response to a signal indicating that execution of the thread of instructions has commenced.

16. The apparatus of claim 13, wherein the means for dispatching the thread of instructions for execution and during the thread execution generating the semaphore entry for the thread if the variable is in a third state comprises:
    logic to dispatch the thread of instructions to execution circuitry; and
    logic to transmit a message to a semaphore entity to request control of the semaphore by the thread of instructions in response to the execution of a set of instructions.

17. The apparatus of claim 12 further comprising:
a semaphore entity to maintain entries for the semaphore indicating one or more threads of instructions requesting control of the semaphore; and
wherein said logic of the apparatus is a thread dispatcher coupled with the semaphore entity and the execution circuitry, the thread dispatcher being arranged to determine the state of the variable corresponding to the semaphore, generate a message to the semaphore entity to cause a semaphore entry for the thread of instructions to be generated prior to dispatch of the thread of instructions to the execution circuitry for execution if the variable is in the first state, and dispatch the thread of instructions to the execution circuitry for execution prior to generating the message to the semaphore entity to cause the semaphore entry for the thread to be generated if the variable is in the second state.

18. The apparatus of claim 17, wherein the thread dispatcher further dispatches the thread of instructions for execution and without generating a semaphore entry for the thread if the variable is in a third state.

19. The apparatus of claim 17, wherein the semaphore entity maintains one or more semaphores.

20. The apparatus of claim 17, wherein the message comprises a semaphore identifier field, a thread identifier field, and a field corresponding to the variable.

* * * * *